United States Patent
Xiao et al.

(10) Patent No.: US 7,618,202 B2
(45) Date of Patent: Nov. 17, 2009

(54) SUPPORT FOR COMPUTER PERIPHERAL DEVICE

(75) Inventors: Shi-Ying Xiao, Taipei (TW); Yi-Jun Lai, Taipei (TW); Zhong-Wei Lin, Taipei (TW)

(73) Assignee: Kye Systems Corp., Taipei (TW)

( * ) Notice: Subject to any disclaimer, the term of this patent is extended or adjusted under 35 U.S.C. 154(b) by 36 days.

(21) Appl. No.: 11/979,862

(22) Filed: Nov. 9, 2007

(65) Prior Publication Data

US 2009/0095871 A1    Apr. 16, 2009

(30) Foreign Application Priority Data

Oct. 12, 2007    (TW) .............................. 96138368 A

(51) Int. Cl.
    *G03B 17/00*    (2006.01)
(52) U.S. Cl. ................... 396/428; 248/226.11; 248/918
(58) Field of Classification Search ............ 248/226.11,
    248/121, 440, 440.1, 316.1, 316.5, 229.13,
    248/229.23, 918; 396/428, 419; 348/373;
    352/243
    See application file for complete search history.

(56) References Cited

U.S. PATENT DOCUMENTS

| 5,855,343 | A  | * | 1/1999 | Krekelberg ................. 248/121 |
| 6,431,507 | B2 | * | 8/2002 | Prather et al. ............... 248/166 |
| 6,663,066 | B1 | * | 12/2003 | Hong .................... 248/231.41 |
| 6,679,463 | B1 | * | 1/2004 | Chen ........................ 248/126 |
| 7,048,454 | B2 | * | 5/2006 | Sitoh et al. .................. 396/428 |
| 7,219,866 | B2 |   | 5/2007 | Depay et al. |
| 2005/0230583 | A1 | * | 10/2005 | Wu ........................ 248/231.41 |
| 2005/0265712 | A1 | * | 12/2005 | Sitoh et al. .................. 396/428 |
| 2006/0170817 | A1 | * | 8/2006 | Wu ............................. 348/373 |
| 2007/0212057 | A1 | * | 9/2007 | Liang ........................ 396/428 |

* cited by examiner

*Primary Examiner*—Ramon O Ramirez
(74) *Attorney, Agent, or Firm*—Bacon & Thomas, PLLC

(57) ABSTRACT

The present invention relates to a support of a computer peripheral device including a first frame, a second frame pivotally coupled to the first frame at a first end, and a movable arm connected to and movable relative to the second frame. The second frame has an extension at the other end for clamping an object between the extension and the first frame. A computer peripheral device is coupled to an end of the movable arm opposite the end that is coupled to the second frame.

10 Claims, 6 Drawing Sheets

SUPPORT FOR COMPUTER PERIPHERAL DEVICE

BACKGROUND OF THE INVENTION

1. Field of the Invention

The present invention relates to a support, and in particular to a support for supporting a computer peripheral device on a surface or for clamping the computer peripheral device to an object while permitting linear and angular adjustment of a position of the computer peripheral device relative to the object.

2. Description of the Prior Art

Because of advances in the field of electronics, computer peripheral devices are becoming smaller and smaller. For example, microphones, wireless receivers, card readers, and web cams are all getting much smaller than ever.

There are two ways to position a computer peripheral device near a computer. The first is to place it on a desk top while the second is to clamp it on an object, such as a computer screen. An example of clamping a peripheral is disclosed in U.S. Pat. No. 7,219,866. However, a disadvantage of current clamping technology is that the peripheral cannot be placed on a surface of a table when it is coupled to the clamp support. In addition, the peripheral coupled to the support cannot be moved relative to the user, which is especially inconvenient in the case of a web cam where the distance to the user needs to be adjusted to optimize an image of the user.

SUMMARY OF THE DISCLOSURE

It is an objective of the present invention to provide a support for a computer peripheral device that overcomes the disadvantages of prior supports.

To accomplish this objective, the invention includes a first frame, a second frame pivotally coupled to the first frame at a first end, and a movable arm extending from a second end of the second frame and movable relative to the second frame. The second frame has an extension at the second end, and an object to be clamped is held between the extension and the first frame. A computer peripheral device is coupled to a distal end of the movable arm opposite to the end that is within the second frame so that the peripheral device can either be supported on a surface or clamped to objects of various thickness, and so that the position of the computer peripheral device can be adjusted relative to the object even when the computer peripheral device is clamped to the object.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention.

Figure 1:
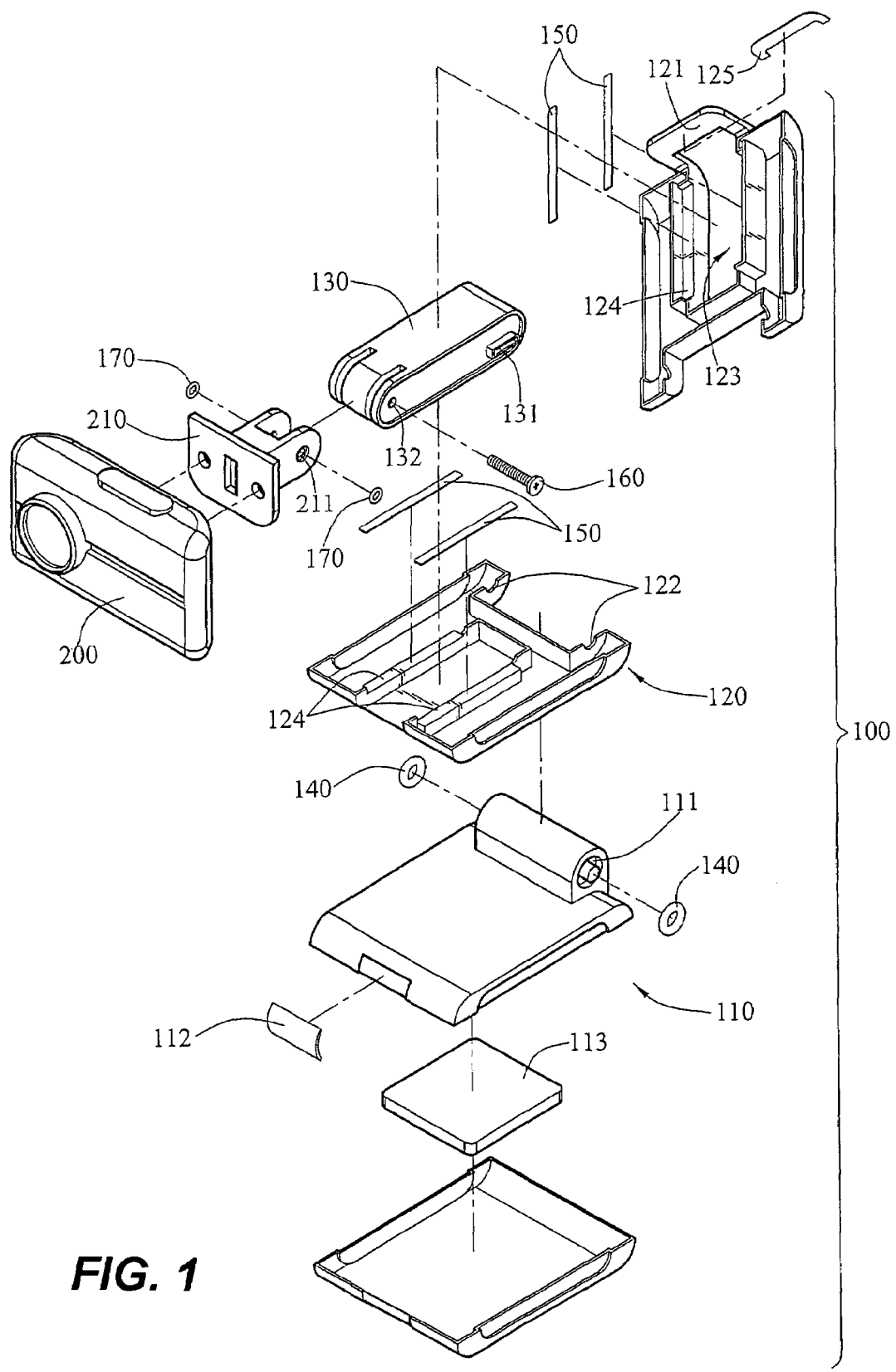
FIG. 1 is an exploded isometric view of a support structure constructed in accordance with the principles of a preferred embodiment of the present invention.
Figure 2:
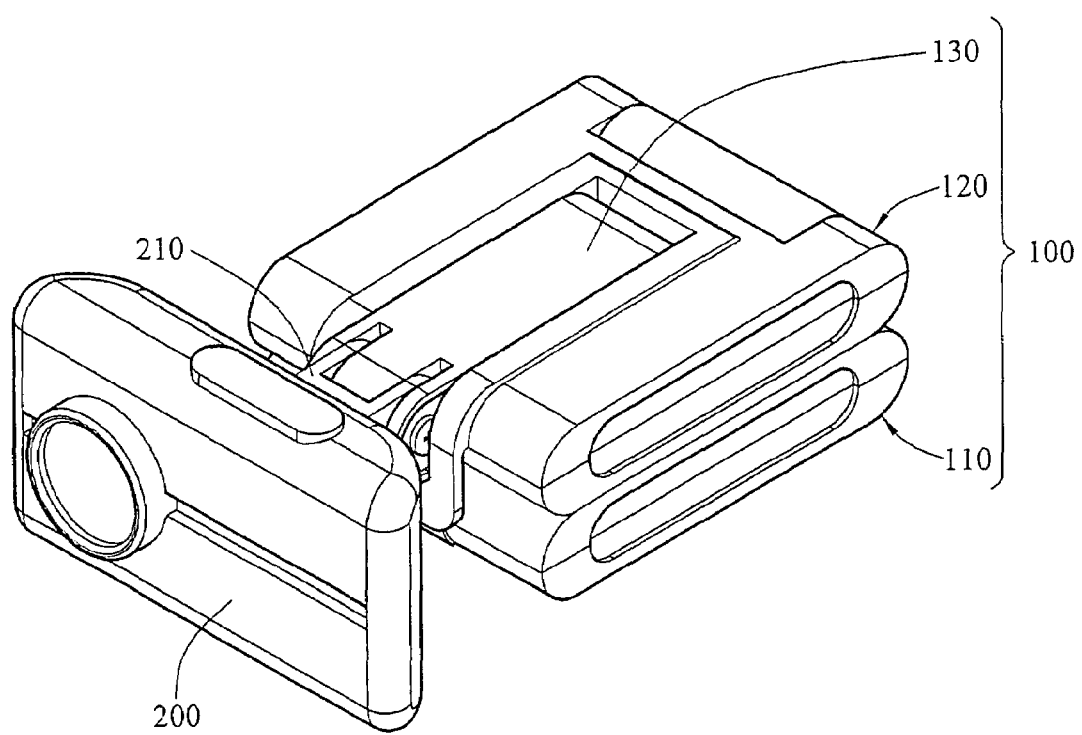
FIG. 2 is an isometric view of the preferred embodiment.
Figure 3:
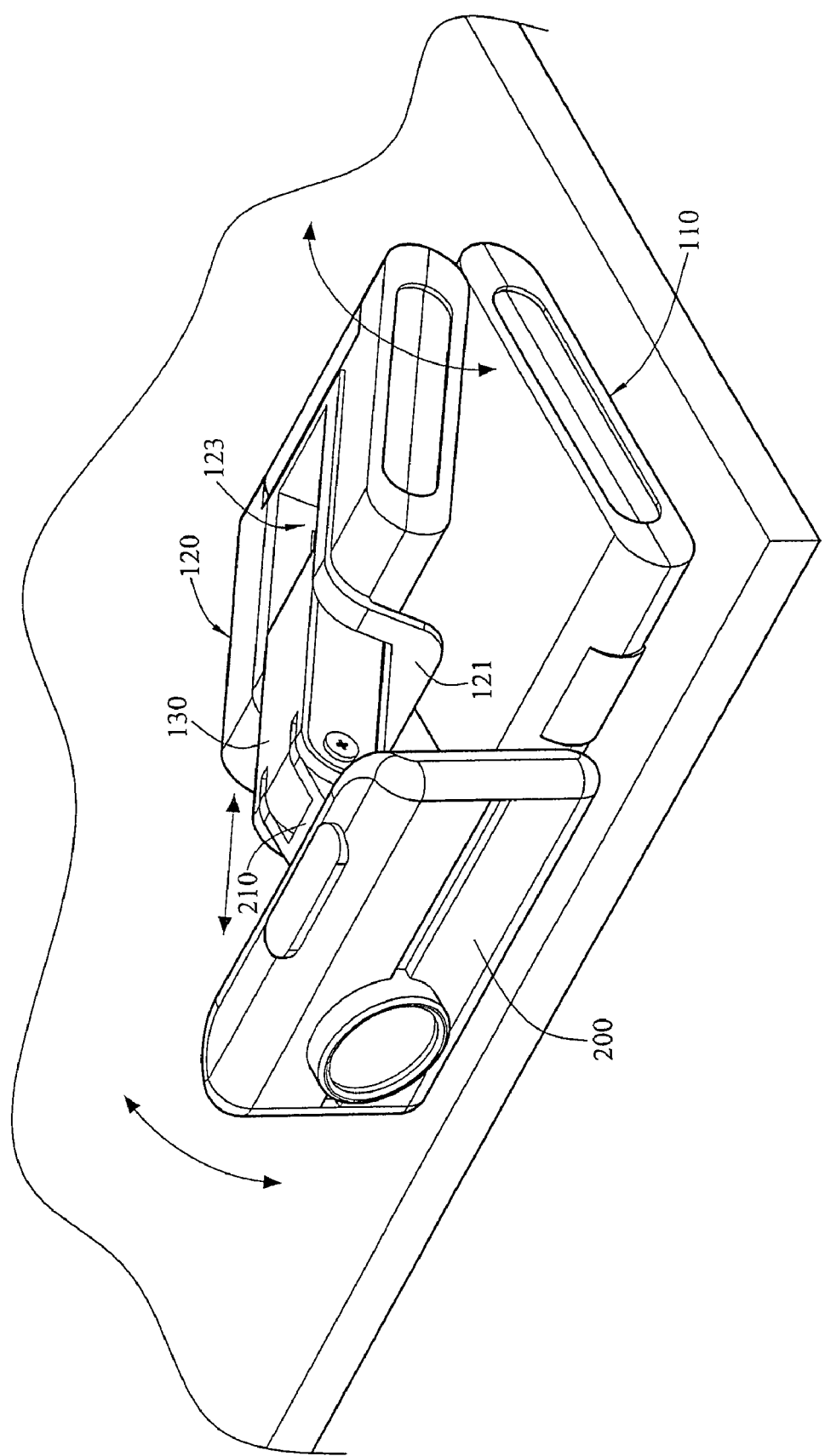
FIG. 3 is another isometric view of the preferred embodiment.

FIGS. 1 and 2 show an embodiment of the present invention in which the computer peripheral device is a web cam, although those skilled in the art will appreciate that the support of the invention may also be applied to other types of computer peripheral device. A support 100 includes a first frame 110, a second frame 120, a moving arm 130, and a web cam 200. The first frame 110 has an upper portion and a lower portion for accommodating a relatively heavy member 113, which may by way of example and not limitation be made of metal, for increasing the weight of the first frame 110. The upper side of the first frame 110 has an axle 111 which couples to the second frame 120 and is held in the first frame by a first retaining unit, such as a first gasket 140 positioned at each side of the axle 111. As a result of the axle, the second fame 120 can be turned by a user to a desired angle relative to the first frame 110 as shown in FIGS. 2 and 3, and then maintained in the desired position by the retaining unit.

The axle 111 is held in the second frame 120 by a pair of indents 122 at a first end, and the second frame 120 has a clamping extension 121 at a second end opposite the first end. The second frame 120 also has a rectangular opening 123 for receiving a movable arm 130. The second frame 120 has an upper portion and a lower portion for clamping a pair of protrusions 131 of the movable arm 130 within recesses 124 on each side of an opening 123 for receiving the movable arm. The movable arm 130 couples to a second retaining unit, such as second gaskets 150, positioned at each side of the protrusions 131 for movably maintaining the moving arm 130 at a desired position within the second frame 120 when the moving arm is not being moved by a user. Thus, the movable arm 130 can be linearly moved within the opening 123 to a desired position (length) relative to the second frame 120 (i.e. the distance between the user and the web cam 200 can be varied) while being retained within the second frame by the engagement between protrusions 131 and edges of the recesses 124 in the two parts of the second frame. The recesses 124 form guide slots at the sides of opening 123 when the two parts of the second frame are secured to each other, thereby capturing the protrusions 131. The other end of the movable arm 130 has a pair of holes 132 for receiving a screw 160.

The web cam 200 has an adapter 210 which also has a pair of holes 211 corresponding respectively to the holes 132 in the movable arm 140. Once the adapter 210 has been aligned with and coupled to the movable arm 130, the screw 160 can penetrate holes 132 and holes 211 for a pivotal connection. A third retaining unit, such as third gaskets 170 are located within each of the holes 211. Thus, the web cam 200 can be turned to a desired angle relative to the movable arm 130 as shown in FIG. 3.

Figure 4A:
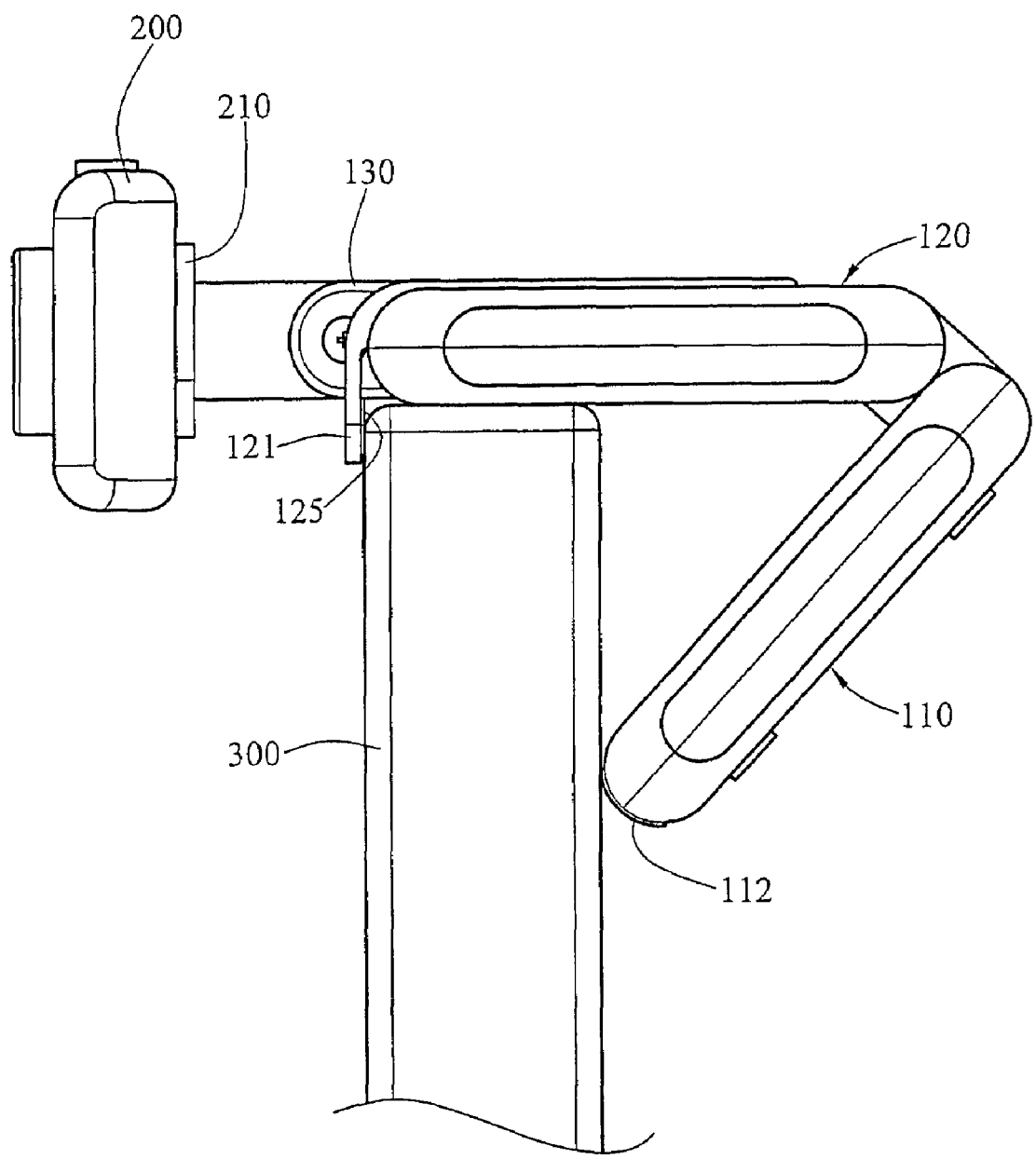
FIG. 4A is a side view of the preferred embodiment, clamped on a thin object.
Figure 4B:
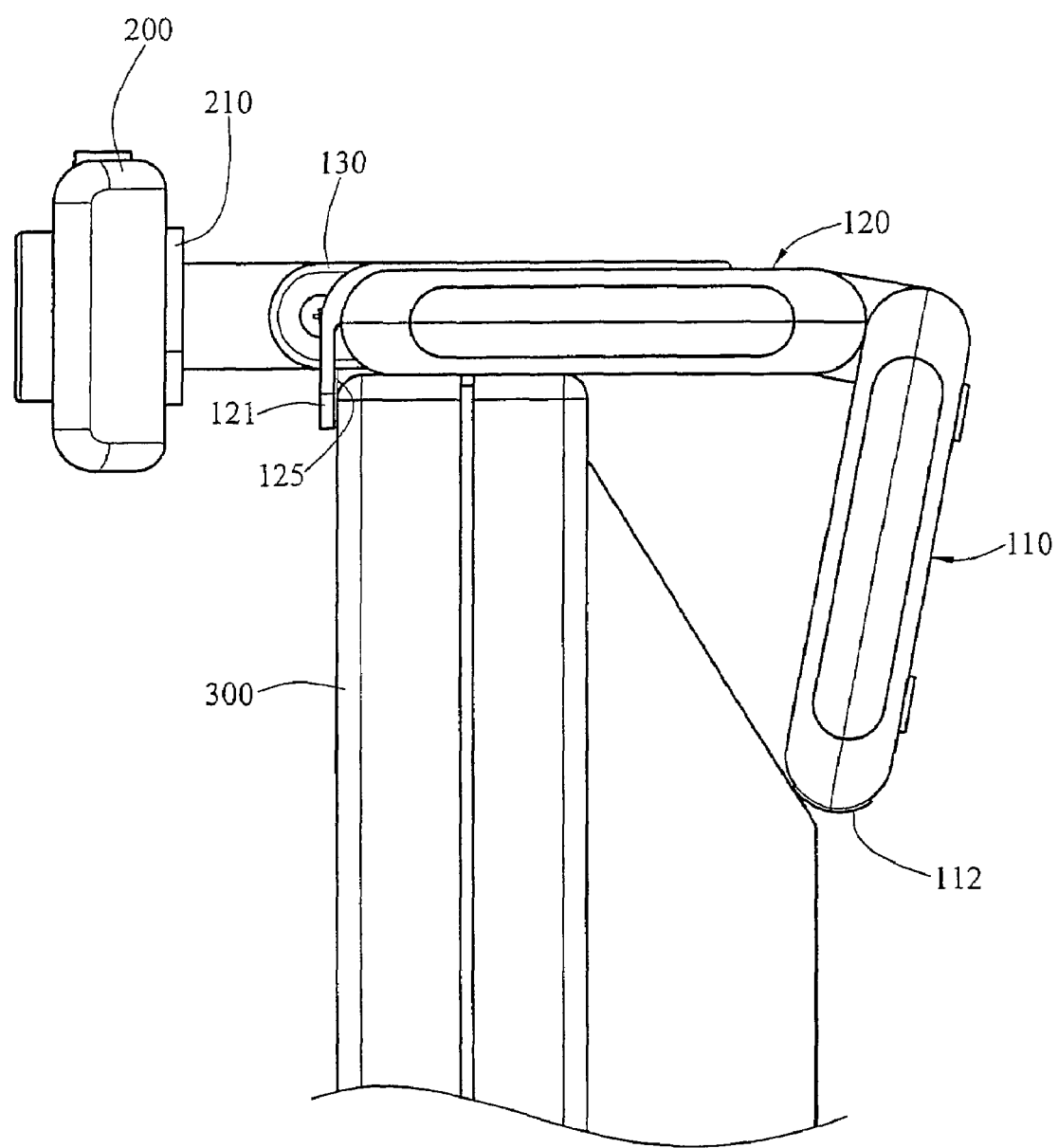
FIG. 4B is a side view of the preferred embodiment, clamped on a thick object.

Pad 112 is positioned on an end of the first frame 110 while pad 125 is located at the inner side of the extension 121, as shown in FIGS. 4A and 4B, for preventing damage and increasing friction between the support and the object when the support is clamped to an object as shown in FIGS. 4A and 4B.

Referring to FIG. 2, the first frame 110 and second frame 120 can be folded for easy carrying. In addition, the outer side of the first frame 110 can be placed on a table or other surface for multiple configurations in use.

Figure 4C:
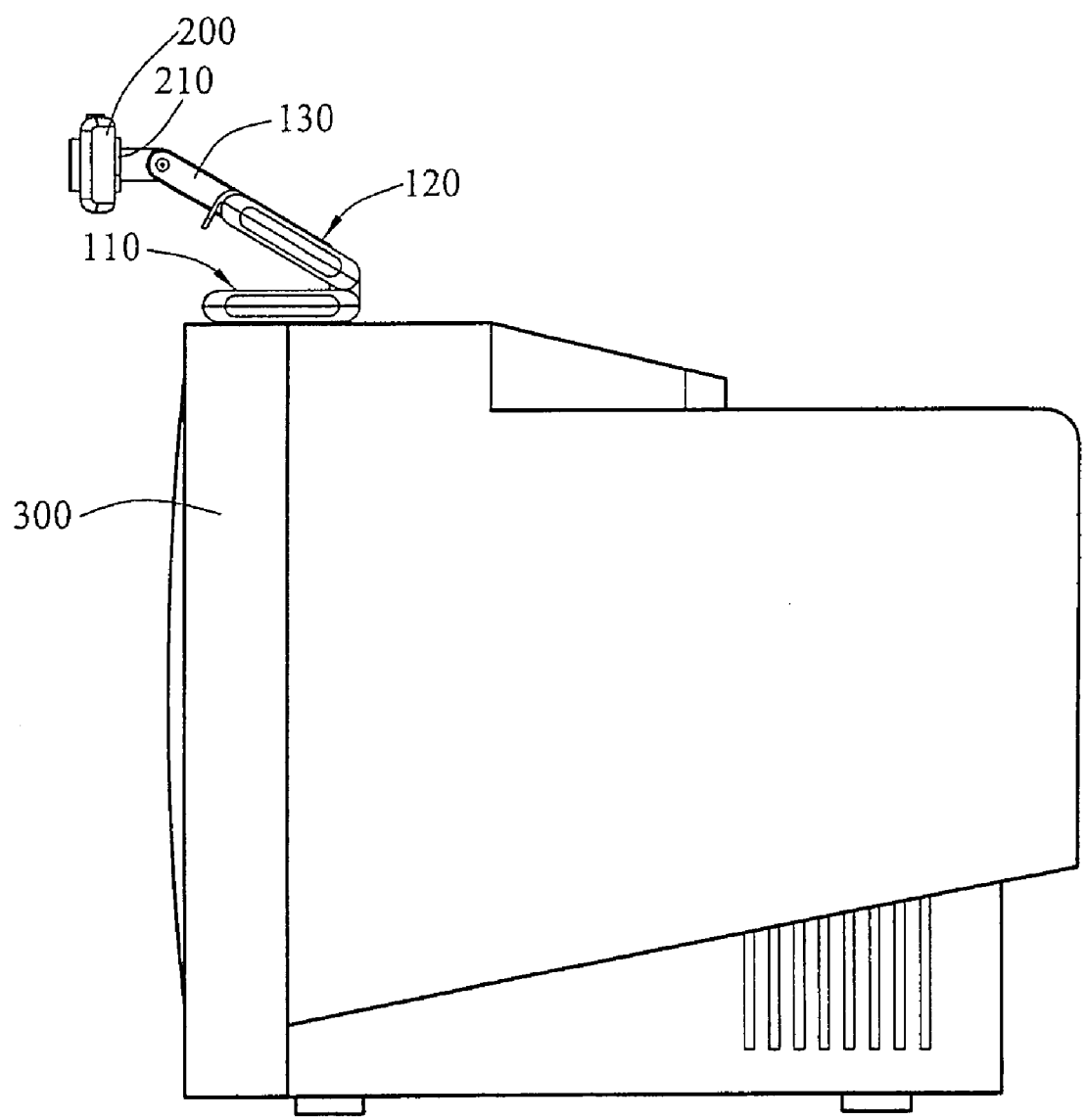
FIG. 4C is a side view of the preferred embodiment, standing on an object.

Referring to FIG. 4A, a thin object, such as a LED display 300 can be held between the extension 121 of the second frame 120 and the first frame 110 when the first frame 110 is adjusted to a relatively small angle with respect to the second frame 120. As shown in FIG. 4B, a thicker display 301 can be hold between the extension 121 and first frame 110 when the first frame 110 is adjusted to a larger angle with respect to the second frame 120. Further, as shown in FIG. 4C, the first frame 110 can be placed upon the case of a CRT display 302 that is two wide to accommodate clamping. In that case, the web cam 200 not only can still be turned to a desired angular position relative to the movable arm 130, but the movable arm 130 can also be moved to a desired position (length) relative to the second frame 120. It is understood that the distance between the extension 121 and the axle 111 remains the same whether the object is a thin or a thicker one.

While the description above refers to a particular embodiment of the present invention, it will be understood that many modifications may be made without departing from the spirit thereof and that the above description is not intended to be limiting. It will be appreciated that the term "retaining unit" is not limited to the gaskets 140, 150, 170, and so forth described herein. Instead, the retaining unit as used herein refers to any mechanism, device, or structure for holding the corresponding element(s), such as the axle 111 or adapter 210, in a desired position while still allowing a user to change the position. In addition, the retaining unit may use friction or positive locking to maintain a desired position. The accompanying claims are intended to cover all such modifications, and any other modifications, as would fall within the true scope and spirit of the present invention.

What is claimed is:

1. A support coupled to a computer peripheral device, comprising:

a first frame:
   a second frame having a first end and a second end, said second frame pivotally coupled to the first frame at said first end; and
   a movable arm extending from the second frame at the second end, said movable arm being linearly movable relative to the second frame;
   wherein the second frame has an extension at the second end for holding an object between the extension and the first frame; and the computer peripheral device is coupled to an end of the movable arm.

2. The support as claimed in claim 1, wherein the computer peripheral device is pivotally coupled to the movable arm.

3. The support as claimed in claim 2, wherein a retaining unit is located between the computer peripheral device and the movable arm for maintaining a relative angular position between the computer peripheral device and the movable arm.

4. The support as claimed in claim 3, wherein the retaining unit is a gasket.

5. The support as claimed in claim 1, wherein an axle and retaining unit are located between the first frame and second frame, the axle pivotally coupling the first frame to the second frame and the retaining unit maintaining a relative position between the first and second frames.

6. The support as claimed in claim 5, wherein the retaining unit is a gasket.

7. The support as claimed in claim 1, wherein a retaining unit is located between the movable arm and the second frame for maintaining the moving arm at a desired position relative to the second frame when not being move by a user.

8. The support as claimed in claim 7, wherein the retaining unit is a gasket.

9. The support as claimed in claim 1, wherein the movable arm has at least a protrusion which is captured within the second frame to movably retaining the moving arm within the second frame; and the second frame further has an opening for accommodating the movable arm.

10. The support as claimed in claim 9, wherein the protrusion is received within a recess of the second frame.

* * * * *